United States Patent

[11] 3,568,972

| [72] | Inventor | Gale K. Sherman<br>Tustin, Calif. |
|---|---|---|
| [21] | Appl. No. | 815,691 |
| [22] | Filed | Apr. 14, 1969 |
| [45] | Patented | Mar. 9, 1971 |
| [73] | Assignee | McDonnell Douglas Corporation |

[54] INTEGRATED TRACKAGE PILOT SEAT
5 Claims, 6 Drawing Figs.

[52] U.S. Cl. .................................................. 248/419,
297/346, 248/422, 248/429
[51] Int. Cl. ...................................................... B60n 1/02
[50] Field of Search .......................................... 248/405,
406, 157, 419, 420, 422, 424, 429, 430; 297/344,
346, 348

[56] References Cited
UNITED STATES PATENTS

| 2,034,624 | 3/1936 | Lamb | 297/348 |
|---|---|---|---|
| 2,742,952 | 4/1956 | Bellamy | 248/430 |
| 2,753,947 | 7/1956 | Mach | 297/344 |
| 2,821,240 | 1/1958 | Morrill | 5/8 |
| 2,796,614 | 6/1957 | Villa Torre | 5/8 |
| 2,858,877 | 11/1958 | Krause | 297/344 |
| 3,313,512 | 4/1967 | Colautti et al. | 248/419 |
| 3,437,302 | 4/1969 | Homier | 248/422 |
| 3,456,912 | 7/1969 | Ellenberger | 248/424 |

FOREIGN PATENTS

| 914,483 | 6/1946 | France | 297/344 |
|---|---|---|---|
| 971,865 | 4/1950 | France | 248/420 |
| 1,331,930 | 6/1963 | France | 248/424 |
| 553,339 | 6/1932 | Germany | 248/429 |

Primary Examiner—Marion Parsons, Jr.
Attorneys—Walter J. Jason, Donald L. Royer and Robert O. Richardson ABSTRACT: A seat telescopically mounted for vertical movement with structure for effecting all directions of motion (laterally and fore and aft) within the seat itself.

INVENTOR.
GALE K. SHERMAN
BY Robert O. Richardson
- ATTORNEY -

PATENTED MAR 9 1971

INVENTOR.
GALE K. SHERMAN
BY Robert O. Richardson
-ATTORNEY- 3,568,972

INTEGRATED TRACKAGE PILOT SEAT

BACKGROUND OF THE INVENTION

For many years airlines and aircraft manufacturers have sought to standardize crew seats in aircraft. In terms of original cost, stocking of spares in replacement the advantage of a standardized seat would be significant. Of similar value would be the advantage to flight crew members who would be "at home" in any seat in any flight compartment. Before a crew seat design could be standardized, it must be satisfactory to the industry. All previous crew seat designs were deficient in that ease of seat adjustment has been lacking, positive locking-in-position has been marginal and, in some cases, uncertain. A large portion of malfunction reports involved excessive looseness, control mechanism difficulties, binding and lack of comfort. A further obstacle to standardization is the variation in floor structure between various makes of aircraft which require variations in span between, and in, floor-mounted seat track configurations. Matching the tracks installed on the floor structure dictated a custom or nonstandardized seat base, the costliest portion of the seat.

A detailed examination of in-service crew seat designs revealed the same basic concept fore and aft travel and locking was accomplished by a pair of parallel tracks secured to the floor, rollers in the seat base located to match the floor tracks, and a locking pin on each side of the seat base to match holes in the tracks. A similar track, roller, and pin arrangement was used for vertical positioning. Misalignment between tracks and rollers could result in binding. The floor tracks also were subject to accumulation of debris and to damage, either of which would result in unsatisfactory seat movement. It was also found that if exact relationship of tracks to seat were not held, one locking pin might index properly in a hole in its matching track, while the corresponding pin on the other side of the seat would fail to enter the track hole. To minimize the problem, the track holes were made oversize which resulted in seats having builtin looseness. The looseness at the floor becomes exaggerated at the level of the seat. Input vibrations of aircraft structure particularly in takeoff and landing, are amplified to the point of making instrument reading difficult.

SUMMARY OF THE INVENTION

The foregoing objections have been overcome in the crew seat utilizing the present invention by incorporating all directions of motion within the seat. Vertical adjustment is done by means of a telescoping tube with the fixed half of the tube assembly built into a truncated pedestal bolted to the floor structure. All horizontal motion is provided within the bottom cushion support pan. Adjustments are included to eliminate looseness both horizontally and vertically.

The captain and first officer seat have fore and aft adjustment and lateral outboard movement to aid in ingress and egress. The outboard motion takes place in the same plane as the fore and aft adjustment and does not add looseness. An interlock prevents outboard travel except when the seat is adjusted to the rearmost position. The flight engineer seat also eliminates floor tracks and all directions of travel are self-contained. In addition, it swivels to face forward for takeoff and landing, outboard to face the flight engineer console, and aft for exiting from the flight compartment. The first observer seat adjusts vertically, fore and aft, and swivels to face inboard. It also does not use floor tracks.

Figure 3:
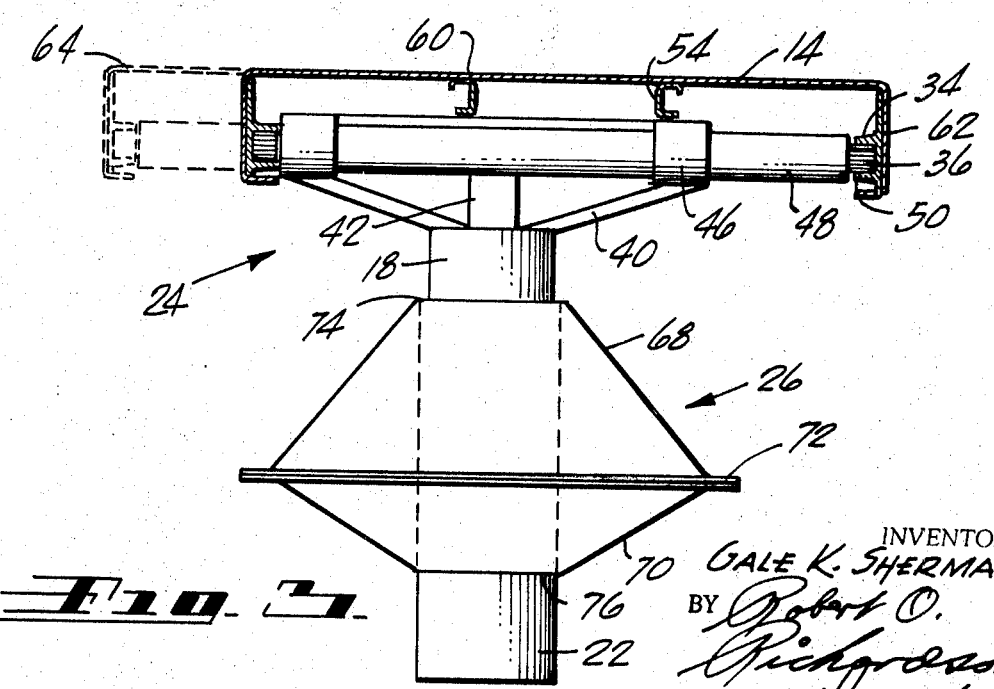
Figure 4:
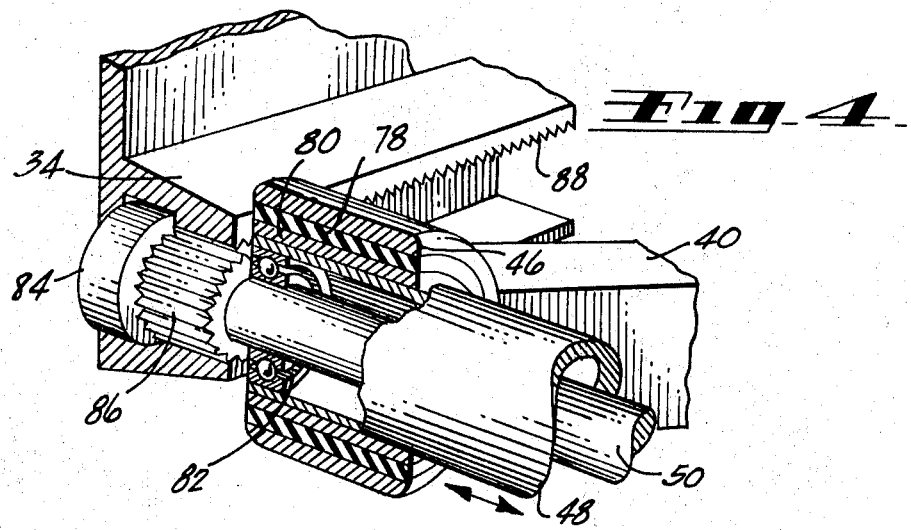
Figure 5:
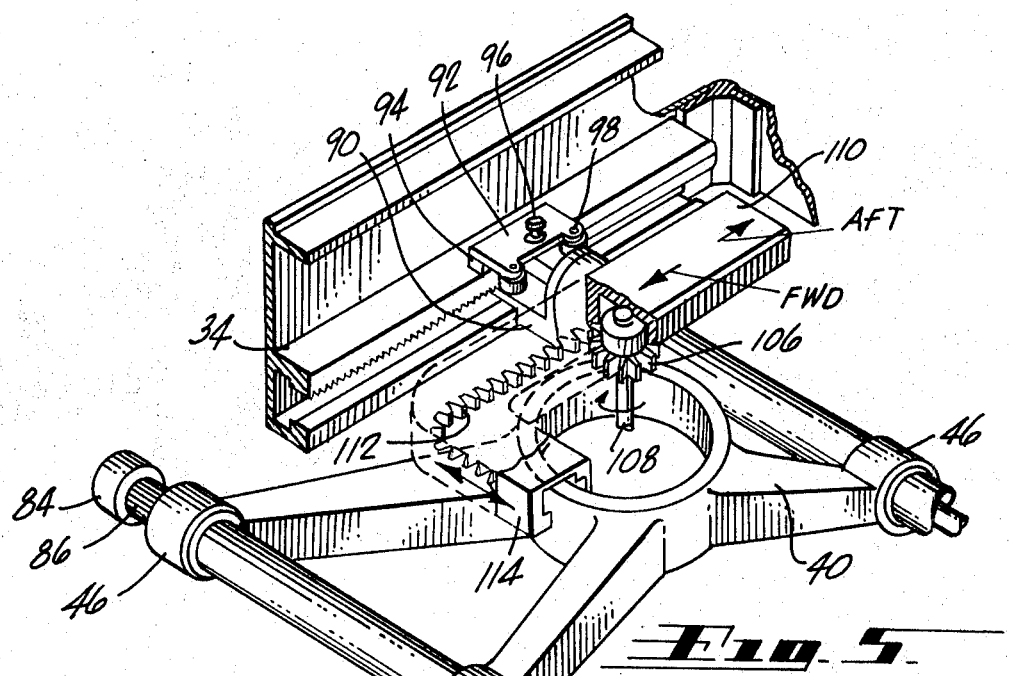
Figure 6:
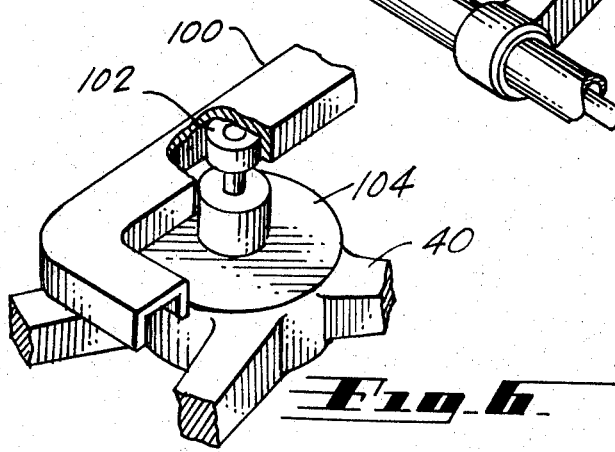

FIG. captain's eat indicating various positions with respect to the control column and control pedestal; is a plan view of the left hand or captain's seat indicating various positions with respect to the control column and control pedestal;

FIG. 3 is a front view of the telescoping pedestal and showing its lateral movement capability;

FIG. 4 is a fragmentary enlarged view, partly in section, of the structure providing directional movement within the seat pan;

FIG. 5 is a perspective view, partially in section, of the seat spider and interlock with the seat pan for the right-hand or first officer's seat; and FIG. 6 is a perspective view of a simplified interlock.

DESCRIPTION OF ILLUSTRATIVE EMBODIMENT

Figure 1:
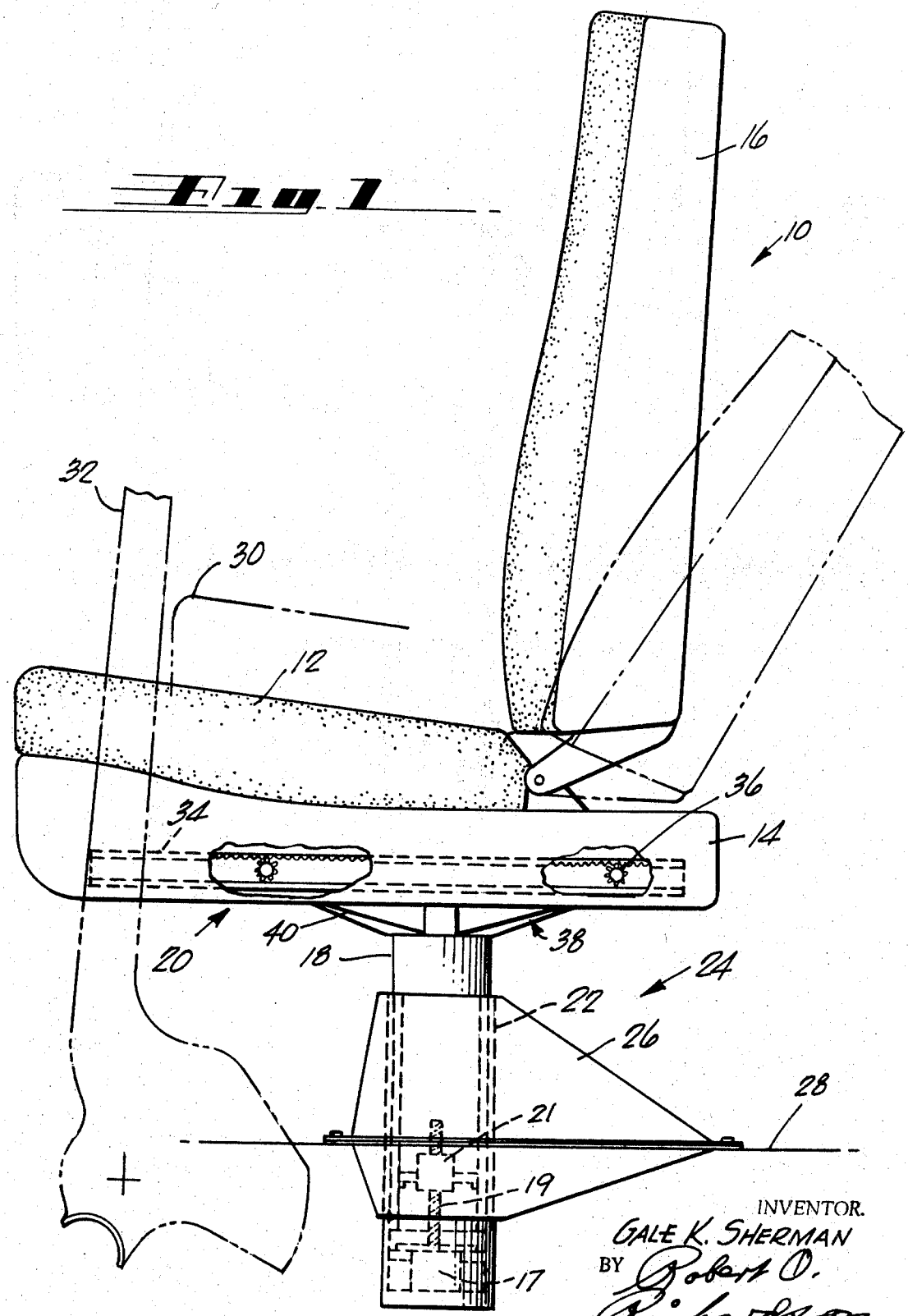
FIG. 1 is a side view showing the seat in its forward position with other positions and the control column shown in phantom lines.

Referring now to FIG. 1 there is shown a seat 10 including a seat bottom cushion 12 on a bottom cushion base frame or support pan 14 to which a seat back 16 is pivotally mounted. Support pan 14, in turn, is mounted to a movable tube support 18 through a seat carrier and spider assembly 20. Movable tube support 18 is telescopically mounted within a fixed tube 22 for vertical movement. Preferably, the vertical movement is electrically actuated, such as for example by a motor 17 driving a screw 19 threaded into a nut 21 affixed to movable tube 18. However, hydraulic, pneumatic or other powered movement sources may be used if desired. The fixed tube 22, which forms the other half of the telescoping tube assembly 24, is contained within a truncated pedestal 26 which is bolted to the floor structure 28.

Phantom line 30 indicates a vertically raised and rearward position of seat bottom cushion 12 wherein lateral movement may be made without interference with the control column of the aircraft, shown by phantom line 32. This is accomplished by movement of a track 34 within cushion support pan 14 moving relative to rollers 36 on spider 38, all to be more fully explained hereinafter.

Figure 2:
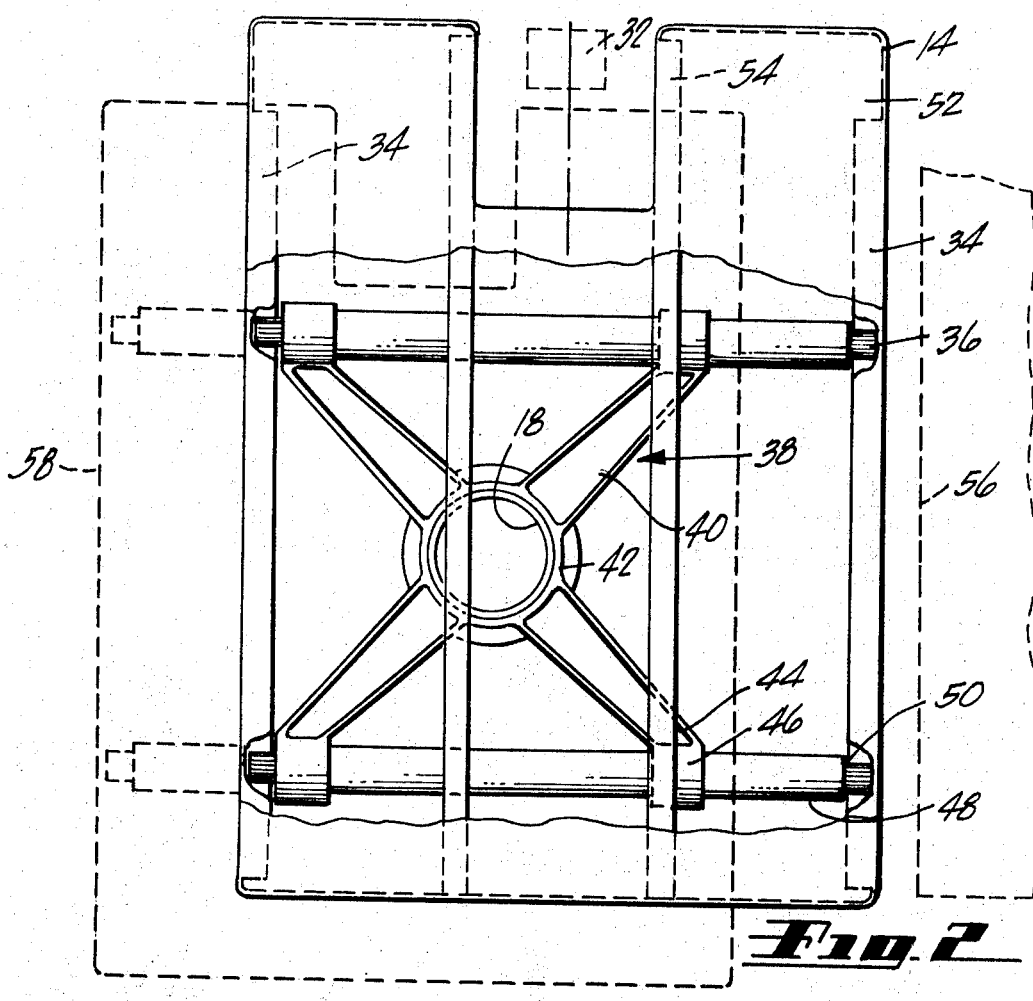

Referring now to FIG. 2 there is shown the support spider 38 in plan view with arms 40 extending radially from a collar 42 which is affixed to the top movable tube support 18. The outer ends 44 of arms 40 terminate in bosses 46 through which a slidable support sleeve 48 is adapted for lateral sliding movement. Rollers 36 are attached to each end of the two axles 50 which are rotatably positioned within the support sleeves 48. These rollers 36 engage tracks 34 which extend longitudinally along the sides of seat cushion support pan 14. Support pan 14 has forward leg support portions 52 which extend forwardly on either side of the aircraft control column 32 in the position shown. Reinforcing strips 54 extend longitudinally along the underside of pan 14.

The seat in FIG. 2, for purposes of illustration, is a left-hand or captains's seat with the cockpit center control pedestal 56 on the right. For the occupant to enter or depart, it is desirable for the seat to be moved rearwardly and outboard, or to the left, to the position shown in dotted line 58. This movement may be done manually or powered and done by pushing buttons or manipulating a toggle as desired. In making this movement there is relative motion between rollers 36 and tracks 34 as pan 14 moves rearwardly and there is relative motion between the spider bosses 46 and the slidable support sleeves 48 as the pan moves laterally to the left.

As can be seen in FIG. 3, all directional movement of the seat, i.e., longitudinal and lateral movement, is within the seat pan 14 and in a single horizontal plane in an integrated trackage arrangement. Here it can be seen that pan 14 has a flat bottom 60 with downturned sides 62. Tracks 34 are affixed to the inner walls of sides 62 and move over rollers 36 in the fore and aft movement of the seat pan 14. Lateral movement to the position shown by dashed lines 64 is accomplished by passage laterally of slidable support sleeve 48 through boss 46 of spider assembly 24.

The truncated pedestal 26 for simplicity purposes may consist of four plates 68 forming a truncated pyramid and four other plates 70 forming an inverted truncated pyramid. These are secured to connecting plates 72, which in turn are used for installing the seat in the aircraft cockpit. Fixed tube 22 fits between the truncated top opening 74 and the truncated bottom opening 76 and may extend further downwardly as much as necessary to provide the desired length of vertical movement. Movable tube 18 fits within tube 22 and is telescopically adapted for vertical movement.

In FIG. 4 there is shown an improved version of a portion of the integrated trackage system. At the end of spider arm 40 is boss 46 within which is a resilient shock mount 78 which tends to absorb and reduce vibration transmitted from the spider to the seat pan. This mount also tends to compensate for any misalignment that may occur in manufacture or assembly. Within this mount 78 is a friction free bearing 80 preferably of a teflon impregnated material to permit the lateral movement of the slidable support sleeve 48 that is positioned therein. A press-fit ball bearing assembly 82 between rotatable axle 50 and sleeve 48 permits rotation of axle 50, and roller 36 which is attached thereto, when there is relative movement between the seat pan and supporting spider, i.e. track 34 on the pan and arm 40 of the spider.

For additional ease of operation and to reduce possible maintenance problems a roller bearing support 84 forms the support surface upon which track 34 moves fore and aft. To prevent skewing and jamming, as when one side of the pan moves fore and aft differently than the other side, notched rollers or gears 86 are positioned at each end of each axle 50. Cooperating notches or teeth 88 on track 34 insure uniform rolling movement of both ends of axle 50.

In FIG. 5 there is shown an additional improvement of a bracket extension 90 to which a clearance takeup assembly plate 92 is bolted. This plate has a strip 94 of frictionless material which rides lightly on the top surface of track 34 during relative movement thereof. Bolt 96 serves as a vertical clearance takeup adjustment. Clearance takeup assembly plate 92 also has a pair of adjustable cam rollers 98 which engage the edge of track 34. Proper adjustment to reduce play and to compensate for any looseness is done by positioning clearance takeup assembly 92 before it is fastened by bolt 96.

A problem alluded to in the description of FIG. 2 was that the seat should be move rearwardly and in the outboard direction, i.e., away from the central control pedestal, to permit ingress and egress of the occupant. The position of the aircraft control column and the leg support portions of the seat pan also dictates a requirement that the seat must never be permitted to move outboard until it is in its rearmost position. Otherwise movement of the control column by the occupant of the other seat may cause it to strike the leg support portion of the pan. Needless to say this could result in additional problems in the control of the aircraft and cannot be tolerated. A simple L-shaped channel 100 attached to and movable with the seat pan (not shown) and guided by a roller 102 on a support spider hub 104, as illustrated in FIG. 6, is one solution to the problem. An L-shaped channel pointing in one direction permits outboard movement of the left seat in the cockpit and the L-shaped channel pointing in the opposite direction permits outboard movement of the right seat in the cockpit. This roller and channel construction is preferred when the seat is adapted for manual operation.

The gear and rack construction shown in FIG. 5 is preferred for powered operation. Here gear 106 is affixed to a power driven shaft 108. L-track 110 is connected to move with the seat pan, and track 34, fore and aft, as well as laterally. This track has teeth 112 engageable with teeth of gear 106. On rotation of shaft 108, the track moves aft until gear 106 reaches the intersection of the two legs of the L-track. At this point, a limit switch cuts off the power to shaft 108 to prevent unintentional outboard movement. Should the occupant then desire outboard movement, an override switch is provided to cause further rotation of gear 106, causing lateral movement of the seat pan as the lateral leg 114 is driven by the gear. An additional feature is provided where, in the event of power failure, shaft 108 is free to rotate and permit manual operation.

Having described selected embodiments of the invention, it will become obvious to those skilled in the art that other modifications may be used and it is intended that these further variations also be construed as part of the present invention.

I claim:
1. An integrated trackage seat comprising:
   a vertically movable support;
   a seat base adapted for longitudinal and lateral movement relative to said support;
   adjusting means within the plane of said seat base interconnecting said seat base to said support for adjusting the position of said seat base in longitudinal and lateral directions relative to said support;
   said adjusting means including track and roller means for longitudinal movement and a support sleeve slidably mounted for lateral movement.

2. An integrated trackage seat as in claim 1 wherein said track means is affixed to said seat base and movable therewith, and said roller means is connected to said support to retain said track means in supported relationship, said support sleeve being slidably retained by said support and rotatably retaining said rollers on the ends thereof.

3. An integrated trackage seat as in claim 2 wherein said support sleeve slides laterally relative to said support and said rollers rotate in a vertical, longitudinal plane.

4. An integrated trackage seat as in claim 1 wherein said adjusting means includes a seat carrier and spider assembly;
   said assembly including arms extending radially from said support, said arms terminating in bosses;
   said support sleeves being slidably mounted within said bosses for movement in a direction along the axes of said sleeves;
   said roller means including roller rotatably mounted at the ends of said sleeves for rotation in another direction; and
   tracks on said seat base engageable with said rollers for relative movement therebetween.

5. An integrated trackage seat as in claim 1 including limiting means for limiting lateral movement of said seat base to when said seat base is in its most rearward longitudinal position only, said limiting means including an L-shaped track affixed to and traveling with said seat base, and control means engageable with said track and fixedly positioned relative to said support for controlling movement of said track relative to said support.

PO-1050
(5/69)

UNITED STATES PATENT OFFICE
CERTIFICATE OF CORRECTION

Patent No. 3,568,972       Dated 9 March 1971

Inventor(s) GAle K. Sherman

It is certified that error appears in the above-identified patent and that said Letters Patent are hereby corrected as shown below:

In column 1, lines 72 through 75, please correct to read:
--FIG. 2 is a plan view of the left hand or captain's seat indicating various positions with respect to the control colun and control pedestal;--.

Signed and sealed this 22nd day of June 1971.

(SEAL)
Attest:

EDWARD M. FLETCHER, JR.                WILLIAM E. SCHUYLER, JR.
Attesting Officer                      Commissioner of Patents